United States Patent
Fu et al.

(10) Patent No.: US 12,477,378 B2
(45) Date of Patent: Nov. 18, 2025

(54) TRANSMISSION DELAY COMPENSATION METHOD AND APPARATUS, DEVICE, AND STORAGE MEDIUM

(71) Applicant: GUANGDONG OPPO MOBILE TELECOMMUNICATIONS CORP., LTD., Guangdong (CN)

(72) Inventors: Zhe Fu, Guangdong (CN); Qianxi Lu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 398 days.

(21) Appl. No.: 18/145,836

(22) Filed: Dec. 22, 2022

(65) Prior Publication Data

US 2023/0209387 A1 Jun. 29, 2023

Related U.S. Application Data

(63) Continuation of application No. PCT/CN2020/112158, filed on Aug. 28, 2020.

(51) Int. Cl.
H04W 28/02 (2009.01)
H04L 5/00 (2006.01)

(52) U.S. Cl.
CPC ....... H04W 28/0236 (2013.01); H04L 5/0048 (2013.01)

(58) Field of Classification Search
CPC ......... H04W 28/0236; H04W 28/0975; H04W 56/004; H04W 56/0055; H04L 5/0048
See application file for complete search history.

(56) References Cited

U.S. PATENT DOCUMENTS

| | | | |
|---|---|---|---|
| 2015/0215884 A1 | 7/2015 | Horvat | |
| 2016/0302165 A1 | 10/2016 | Da | |
| 2020/0259896 A1* | 8/2020 | Sachs | H04L 67/12 |
| 2021/0058884 A1 | 2/2021 | Liu | |
| 2021/0314122 A1 | 10/2021 | Jin | |
| 2021/0337491 A1* | 10/2021 | Xu | G01S 19/256 |
| 2022/0039045 A1* | 2/2022 | Sun | H04W 56/0045 |

(Continued)

FOREIGN PATENT DOCUMENTS

| | | |
|---|---|---|
| CN | 110972155 A | 4/2020 |
| CN | 111356171 A | 6/2020 |

(Continued)

OTHER PUBLICATIONS

Qualcomm Incorporated, "RAT-dependent DL and UL NR positioning techniques," 3GPP TSG-RAN WG1 Meeting AH1901, R1-1900916, Jan. 2019. (Year: 2019).*

(Continued)

Primary Examiner — Kent Krueger
(74) Attorney, Agent, or Firm — PERKINS COIE LLP

(57) ABSTRACT

Provided are a transmission delay compensation method and apparatus, a device, and a storage medium. The method includes that: a network device sends signal configuration information to a terminal device, and the terminal device receives signal configuration information from the network device. The signal configuration information is used for configuring a reference signal for transmission delay compensation between the terminal device and the network device, and the reference signal includes an uplink reference signal and/or a downlink reference signal.

20 Claims, 7 Drawing Sheets

(56) References Cited

U.S. PATENT DOCUMENTS

| | | | | |
|---|---|---|---|---|
| 2022/0132460 A1* | 4/2022 | Shimoda | ............. | H04W 64/003 |
| 2022/0200733 A1* | 6/2022 | Toeda | ................ | H04W 56/001 |

FOREIGN PATENT DOCUMENTS

| | | | |
|---|---|---|---|
| CN | 111511010 A | | 8/2020 |
| CN | 111526575 A | | 8/2020 |
| EP | 3886485 A1 | | 9/2021 |
| WO | 2016164841 A1 | | 10/2016 |
| WO | 2019214380 A1 | | 11/2019 |
| WO | 2020125422 A1 | | 6/2020 |

OTHER PUBLICATIONS

First Office Action of the Chinese application No. 202310910017.X, issued on Sep. 6, 2024. 14 pages with English translation.

Supplementary European Search Report in the European application No. 20950801.9, mailed on Sep. 8, 2023. 11 pages.

Huawei et al: "Discussion on propagation delay compensation for reference time information delivery", 3GPP Draft; R1-1908060, 3rd Generation Partnership Project (3GPP), Mobile Competence Centre; 650, Route Des Lucioles; F-06921 Sophia-Antipolis Cedex; France vol. RAN WG1, No. Prague, Czech Republic; 20190826-2019083017 Aug. 2019 (Aug. 17, 2019), XP051764683, the whole document. 4 pages.

International Search Report in the international application No. PCT/CN2020/112158, mailed on May 26, 2021—5 pages.

Written Opinion of the International Search Authority in the international application No. PCT/CN2020/112158, mailed on May 26, 2021—6 pages.

3GPP, "NG Radio Access Network (NG-RAN); Stage 2 functional specification of User Equipment (UE) positioning in NG-RAN (Release 16)", 3GPP TS 38.305 V16.0.0 (Mar. 2020)—107 pages.

* cited by examiner

TRANSMISSION DELAY COMPENSATION METHOD AND APPARATUS, DEVICE, AND STORAGE MEDIUM

CROSS REFERENCE TO RELATED APPLICATION

This is a continuation of International Patent Application No. PCT/CN2020/112158 filed on Aug. 28, 2020, the disclosure of which is hereby incorporated by reference in its entirety.

BACKGROUND

In 5th-Generation (5G) industrial interest of things (IIoT), it is necessary to support the transmission of factory automation, transport industry, electrical power distribution and other services in 5G system.

The concept of time sensitive network (TSN) or time sensitive communication (TSC) is introduced in IIoT based on its transmission requirements of delay and reliability. In TSN, 5G system will serve as a logical bridge in TSN and provide services for TSN and TSN services. Based on this, the 5G system needs to provide lower delay guarantee and higher synchronization accuracy, so that when TSN services are transmitted in the 5G system, each logical bridge can operate and connect the TSN accurately, and meet the synchronization accuracy requirements of TSN services.

Therefore, how to achieve 5G system to provide higher synchronization accuracy to ensure that 5G system meets the synchronization accuracy requirements of TSN services needs further discussion and research.

SUMMARY

Embodiments of the present disclosure relate to the field of communication technology. In embodiments of the present disclosure, there is provided a method and an apparatus for compensating a transmission delay, a device and a storage medium. The technical solution is as follows.

According to an aspect of the embodiments of the present disclosure, there is provided a method for compensating a transmission delay, applied to a terminal device. The method includes the following operations.

Signal configuration information is received from a network device, the signal configuration information being used to configure a reference signal for transmission delay compensation between the terminal device and the network device.

The reference signal includes at least one of an uplink reference signal or a downlink reference signal.

According to another aspect of the embodiments of the present disclosure, there is provided a method for compensating a transmission delay, applied to a network device. The method includes the following operations.

Signal configuration information is transmitted to a terminal device, the signal configuration information being used to configure a reference signal for transmission delay compensation between the terminal device and the network device.

The reference signal includes at least one of an uplink reference signal or a downlink reference signal.

According to yet another aspect of the embodiments of the present disclosure, there is provided an apparatus for compensating a transmission delay, provided in a terminal device. The apparatus includes:

a configuration information receiving module, configured to receive signal configuration information from a network device, the signal configuration information being used to configure a reference signal for transmission delay compensation between the terminal device and the network device.

The reference signal includes at least one of an uplink reference signal or a downlink reference signal.

According to still another aspect of the embodiments of the present disclosure, there is provided an apparatus for compensating a transmission delay, provided in a network device, The apparatus includes:

a configuration information transmitting module, configured to transmit signal configuration information to a terminal device, the signal configuration information being used to configure a reference signal for transmission delay compensation between the terminal device and the network device.

The reference signal includes at least one of an uplink reference signal or a downlink reference signal.

According to still another aspect of the embodiments of the present disclosure, there is provided a terminal device, including a processor, and a transceiver connected to the processor.

The transceiver is configured to receive signal configuration information from a network device, the signal configuration information being used to configure a reference signal for transmission delay compensation between the terminal device and the network device.

The reference signal includes at least one of an uplink reference signal or a downlink reference signal.

According to still another aspect of the embodiments of the present disclosure, there is provided a network device, including a processor, and a transceiver connected to the processor.

The transceiver is configured to transmit signal configuration information to a terminal device, the signal configuration information being used to configure a reference signal for transmission delay compensation between the terminal device and the network device.

The reference signal includes at least one of an uplink reference signal or a downlink reference signal.

According to still another aspect of the embodiments of the present disclosure, there is provided a computer-readable storage medium, having stored thereon a computer program, wherein the computer program is configured to be executed by a processor of a terminal device to implement the method for compensating a transmission delay on the terminal device side as described above.

According to still another aspect of the embodiments of the present disclosure, there is provided a computer-readable storage medium, having stored thereon a computer program, wherein the computer program is configured to be executed by a processor of a network device to implement the method for compensating a transmission delay on the network device side as described above.

According to still another aspect of the embodiments of the present disclosure, there is provided a chip, including a programmable logic circuit and/or program instructions, wherein the chip, when running on a terminal device, implements the method for compensating a transmission delay on the terminal device side as described above.

According to still another aspect of the embodiments of the present disclosure, there is provided a chip, including a programmable logic circuit and/or program instructions, wherein the chip, when running on a network device, implements the method for compensating a transmission delay on the network device side as described above.

According to still another aspect of the embodiments of the present disclosure, there is provided a computer program product, wherein the computer program product, when running on a terminal device, causes a computer to implement the method for compensating a transmission delay on the terminal device side as described above.

According to still another aspect of the embodiments of the present disclosure, there is provided a computer program product, wherein the computer program product, when running on a network device, causes a computer to implement the method for compensating a transmission delay on the network device side as described above.

BRIEF DESCRIPTION OF THE DRAWINGS

In order to explain more clearly the technical solution of the embodiments of the disclosure, accompanying drawings required in the description of the embodiments will be introduced simply below. It is apparent that the drawings in the below description are only used for some embodiments of the present disclosure, and other drawings may be obtained based on these drawings by those skilled in the art without creative efforts.

DETAILED DESCRIPTION

In order to make the object, technical solution and advantages of the present disclosure clearer, the embodiments of the present disclosure will be described in further detail below with reference to the accompanying drawings.

The network architecture and the business scenario described in the embodiments of the present disclosure are intended to more clearly illustrate the technical solution of the embodiments of the present disclosure and do not constitute a limitation to the technical solution provided by the embodiments of the present disclosure. It is known to those skilled in the art that the technical solution provided by the embodiments of the present disclosure is equally applicable to similar technical problems with the evolution of the network architecture and the emergence of new business scenarios.

Figure 1:
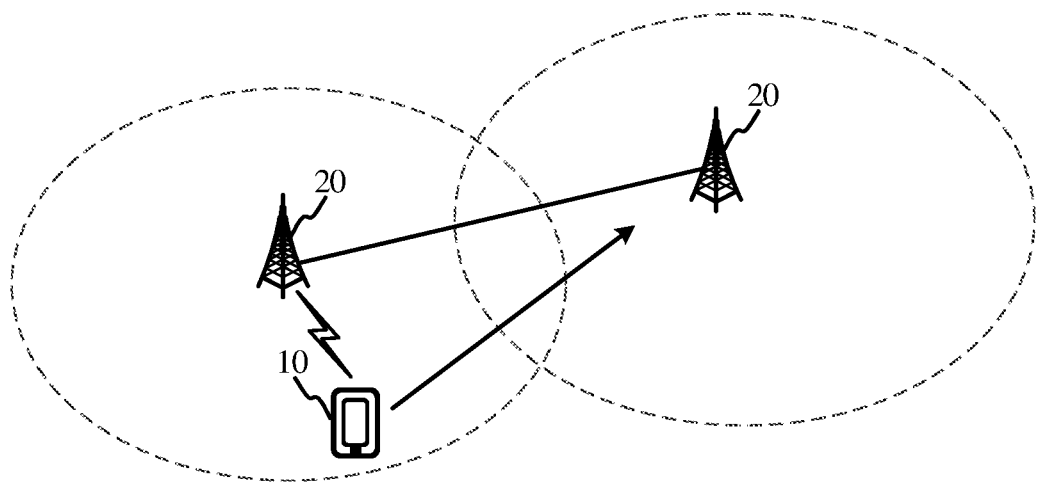
FIG. 1 is a schematic diagram of a system architecture provided by an embodiment of the present disclosure.

Referring to FIG. 1, FIG. 1 is a schematic diagram of a system architecture provided by an embodiment of the present disclosure. The system architecture may include a terminal device 10 and network devices 20.

Typically, there is a plurality of terminal devices 10, and one or more terminal devices 10 may be distributed within cells managed by each network device 20. The terminal device 10 may include various handheld devices, vehicle-mounted devices, wearable devices, computing devices, or other processing devices connected to a wireless modem, as well as various forms of user equipment (UE), mobile station (MS), and the like, which have wireless communication functions. For convenience of description, the above-mentioned devices are collectively referred to as the terminal device in embodiments of the present disclosure.

The network device 20 is an apparatus deployed in an access network to provide a wireless communication function for the terminal device 10. The network device 20 may include various forms of macro base stations, micro base stations, relay stations, access points and the like. In systems with different wireless access technologies, the names of devices with functions of the network device may be different, for example, in 5G new radio (NR) system, they are called gNodeB or gNB. With the evolution of communication technology, the name "network device" may be changed. For convenience of description, in embodiments of the present disclosure, the above-mentioned apparatus for providing a wireless communication function for a terminal device 10 is collectively referred to as a network device.

The "5G NR system" in embodiments of the present disclosure may also be referred to as a 5G system or an NR system, but the meaning thereof will be understood by those skilled in the art. The technical solution described in the embodiments of the present disclosure can be applied to the 5G NR system, and can also be applied to the subsequent evolution system of the 5G NR system.

Figure 2:
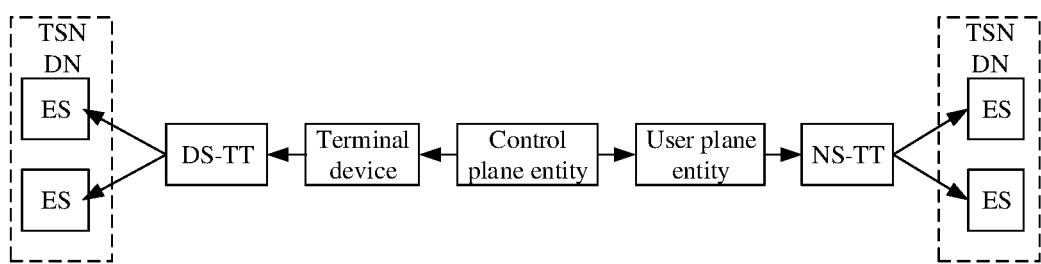
FIG. 2 is a schematic diagram of a TSN communication system provided by an embodiment of the present disclosure.

From the above introduction, in 5G IIoT, it is necessary to support the transmission of factory automation, transport industry, electrical power distribution and other services in 5G system. The concept of TSN or TSC is introduced in IIoT based on its transmission requirements of delay and reliability. In an example, a 5G system may be integrated into a TSN as an ethernet bridge of the TSN, and the integrated system may be referred to as a TSN communication system. Referring to FIG. 2, FIG. 2 is a schematic diagram of a TSN communication system provided by an embodiment of the present disclosure. The TSN communication system may include a TSN and a 5G system.

The 5G system includes a terminal device and various functional entities. In an example, the following functional entities are included in the 5G system.

Radio access network (RAN): similar to the base station in the traditional network, deployed near the terminal device, providing network access function for authorized users in specific areas, and can use different quality transmission tunnels to transmit user data according to user levels and business requirements;

User plane function (UPF): executing forwarding of user packets according to the routing rules of session management function (SMF);

Authentication server function (AUSF): executing security authentication of UE;

Access and mobility management function (AMF): access management and mobility management of UE;

SMF: UE session management;

Network slice selection function (NSSF): selecting network slices for UE;

Network exposure function (NEF): opening network functions to third parties in the manner of northbound API interface;

NF repository function (NRF): providing the storage function and selection function of network function entity information for other network elements;

Unified data management (UDM): user signing context management;

Policy control function (PCF): user policy management; and

Application function (AF): user application management.

TSN includes end station (ES) and centralized network controller (CNC). The CNC is used to uniformly manage the services of the whole TSN communication system.

As illustrated in FIG. 2, the terminal device in the 5G system is connected to one or more ESs in the TSN date network (DN) outside the 5G system through device side TSN translator (DS-TT). The user plane entity is connected to one or more ESs in the TSN DN through the network TSN translator (NW-TT). Both DS-TT and NW-TT can provide a port for data transmission.

It can be seen that in TSN, 5G system will serve as a logical bridge in TSN and provide services for TSN and TSN services. Therefore, the 5G system needs to provide lower delay guarantee and higher synchronization accuracy, so that when TSN services are transmitted in the 5G system, each logical bridge can operate and connect the TSN accurately, and meet the synchronization accuracy requirements of TSN services.

In Release 17 (R17), based on the requirement of TSN service transmission, TSN service needs to meet the synchronization accuracy requirement of less than 900 nanoseconds (ns) when transmitted in 5G system. At present, in the research of terminal device positioning in Release 16 (R16), the positioning method based on receive (Rx)-transport (Tx) time difference (hereinafter referred to as "RX-TX based positioning method") has high accuracy, and the obtained round-trip time (RTT) can reach the accuracy of several nanoseconds.

Figure 3:
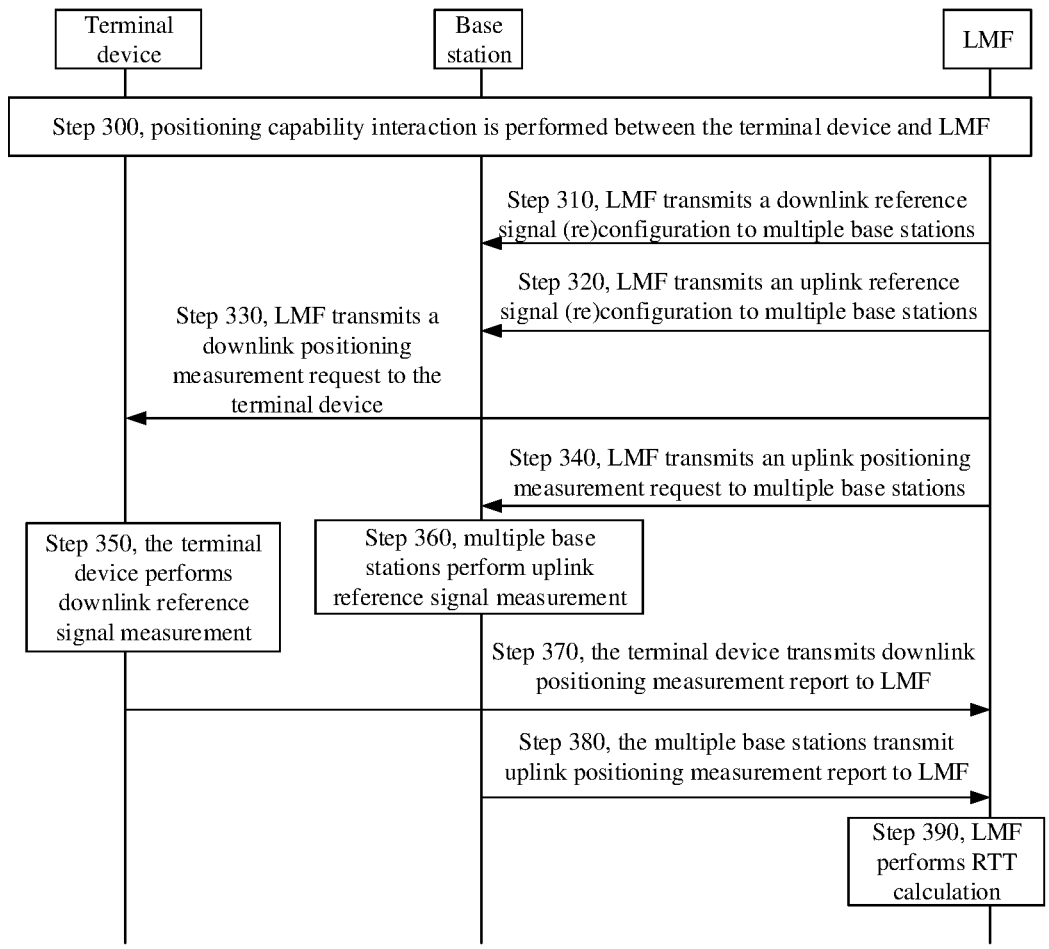
FIG. 3 is a flowchart of an RX-TX based positioning method provided by an embodiment of the present disclosure.

In an example, in the RX-TX based positioning method, taking location management function (LMF) as a location center, the LMF controls multiple base stations to perform RTT measurement cooperatively. The multiple base stations include a base station corresponding to a service cell of terminal device and at least one base station adjacent to the base station corresponding to the service cell. Referring to FIG. 3, FIG. 3 is a flowchart of an RX-TX based positioning method provided by an embodiment of the present disclosure. The RX-TX based positioning method includes the following steps.

In step 300, a positioning capability interaction is performed between the terminal device and the LMF. Exemplarily, the LMF requests the terminal device to acquire a positioning capability, and the terminal device reports the positioning capability to the LMF after receiving the request from the LMF.

In step 310, the LMF transmits a downlink reference signal (re)configuration to multiple base stations. The downlink reference signal (re)configuration includes a starting position (or time) of downlink reference signal measurement, the transmitting window, the downlink reference signal, etc. Optionally, the downlink reference signal includes at least one of the following: positioning reference signal (PRS), demodulation reference signal (DMRS), tracking reference signal (TRS), channel state information reference signal (CSI-RS) or sounding reference signal (SRS).

In step 320, the LMF transmits an uplink reference signal (re)configuration to multiple base stations. Similar to step 310, the uplink reference signal (re)configuration includes the starting position (or time) of the uplink reference signal, a measurement window, an uplink reference signal and the like. Optionally, the uplink reference signal includes at least one of the following: SRS, DMRS, etc.

In step 330, the LMF transmits a downlink positioning measurement request to the terminal device. The downlink positioning measurement request is used to request the terminal device to measure the downlink reference signal and report the measurement result. Optionally, the downlink positioning measurement request includes positioning assistance information, which includes a cell identifier (ID), a reference signal configuration, and the like. The reference signal configuration includes an uplink reference signal configuration and/or a downlink reference signal configuration.

In step 340, the LMF transmits an uplink positioning measurement request to multiple base stations. The uplink positioning measurement request is used to request the multiple base stations to measure the uplink reference signal and report the measurement result. Optionally, the uplink positioning measurement request includes positioning assistance information, which includes a cell ID, a reference signal configuration, measurement and reporting indication, etc.

In step 350, the terminal device performs downlink reference signal measurement. After receiving the downlink positioning measurement request from the LMF, the terminal device receives the downlink reference signal on the designated time-frequency resource according to the downlink reference signal configuration.

In step 360, the multiple base stations perform uplink reference signal measurement. After receiving the uplink positioning measurement request from the LMF, the multiple base stations receive the uplink reference signal on the designated time-frequency resource according to the uplink reference signal configuration.

In step 370, the terminal device transmits a downlink positioning measurement report to the LMF. Optionally, the downlink positioning measurement report includes an Rx-Tx time difference, and a cell ID corresponding to the Rx-Tx time difference. The Rx-Tx time difference included in the downlink positioning measurement report is the time difference between the receiving time of the downlink reference signal and the transmission time of the uplink reference signal corresponding to the same base station or the same cell.

In step 380, the multiple base stations transmit an uplink positioning measurement report to the LMF. Optionally, the uplink positioning measurement report includes the Rx-Tx time difference, and a cell ID corresponding to the Rx-Tx time difference. The Rx-Tx time difference included in the uplink positioning measurement report is the time difference between the receiving time of the uplink reference signal and the transmission time of the downlink reference signal for the terminal device.

In step 390, the LMF performs RTT calculation. Because the positions of the multiple base stations are known, RTT can be calculated by measured Rx-Tx time difference, so as to calculate the distance from terminal device to each base station or cell, and the multiple base stations can determine the unique position of terminal device in space, thereby realizing accurate positioning of terminal device.

In order to ensure the 5G system to achieve higher synchronization accuracy, in the embodiments of the present disclosure, there is proposed to apply the idea of the RX-TX based positioning method to the accurate synchronization between terminal device and network device. In order to achieve accurate synchronization, it is necessary to compensate the transmission delay between terminal device and network device. However, there is no method for obtaining and compensating the transmission delay in related art. In addition, as can be seen from the above example, in the RX-TX based positioning method, LMF configures uplink and downlink reference signals between terminal device and multiple base stations participating in positioning, and calculates RTT to realize accurate positioning of the terminal device. However, because RTT is calculated by LMF, the terminal device and multiple base stations do not perceive RTT, and thus cannot perform other operations according to RTT, such as performing transmission delay compensation according to RTT.

Based on this, there is provided a method for compensating a transmission delay, a network device configures a reference signal for transmission delay compensation for a terminal device, and then the terminal device and the network device can determine a signal transmission delay based on the transmitting or receiving of the reference signal, or determine a transmission delay compensated in the transmission delay compensation, so as to further realize the compensation of the transmission delay of the signal transmitted between the terminal device and the network device. There is provided a method for compensating a transmission delay, which ensures the accurate synchronization between the terminal device and the network device.

The following is a combination of several examples to introduce the technical solution of the present disclosure.

Figure 4:
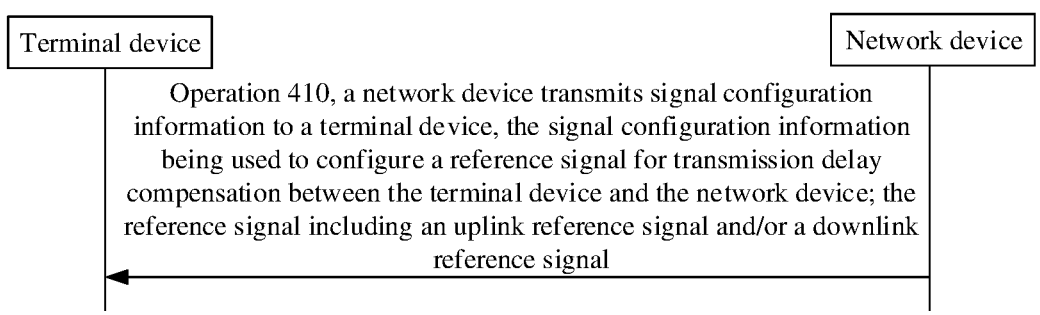
FIG. 4 is a flowchart of a method for compensating a transmission delay provided by an embodiment of the present disclosure.

Referring to FIG. 4, FIG. 4 is a flowchart of a method for compensating a transmission delay provided by an embodiment of the present disclosure. The method may be applied to the system architecture illustrated in FIG. 1. The method may include the following operation 410.

At operation 410, a network device transmits signal configuration information to a terminal device, the signal configuration information being used to configure a reference signal for transmission delay compensation between the terminal device and the network device. The reference signal includes at least one of an uplink reference signal or a downlink reference signal.

From the above introduction, it can be seen that in order to realize the accurate synchronization between the terminal device and the network device, it is necessary to compensate the transmission delay of a signal transmitted between terminal device and network device. Therefore, in the process of transmission delay compensation, it is necessary to determine the signal transmission delay between the terminal device and the network device or the transmission delay compensated in the transmission delay compensation. Based on this, the network device may transmit signal configuration information to the terminal device to configure the reference signal, and then determine the signal transmission delay or the transmission delay compensated in the transmission delay compensation according to the receiving or transmitting time of the reference signal.

Optionally, the network device is a network device corresponding to a serving cell of the terminal device. For example, the network device includes an access network device (such as a gNB or the like) deployed in an access network to provide a wireless communication function for the terminal device. Optionally, the terminal device satisfies at least one of the following conditions: having high precision transmission requirement, supporting transmission of a time sensitive network (TSN) service, or supporting transmission of a general precise time protocol (gPTP) message. Therefore, in the embodiments of the present disclosure, the network device corresponding to the service cell of the terminal device that has high precision transmission requirement/supports transmission of TSN service/supports transmission of gPTP message may transmit signal configuration information to the terminal device to configure the reference signal.

The reference signal includes at least one of an uplink reference signal or a downlink reference signal. On the one hand, after configuring the reference signal for the terminal device, the network device may transmit downlink reference signal to the terminal device. On the other hand, after receiving the signal configuration information from the network device, the terminal device may transmit an uplink reference signal to the network device. The embodiments of the present disclosure do not limit the specific signal types of the uplink reference signal and the downlink reference signal. Optionally, the uplink reference signal includes at least one of the following: SRS, preamble, DMRS, PRS, TRS or CSI-RS. Optionally, the downlink reference signal includes at least one of the following: PRS, CSI-RS, synchronization signal (SS) block (SSB)/physical broadcast channel (PBCH) blocks, cell reference signal (CRS), DMRS or TRS. Optionally, the uplink reference signal and the downlink reference signal are of the same signal type, for example, both the uplink reference signal and the downlink reference signal are DMRS. Or the uplink reference signal and the downlink reference signal are of different signal types, for example, the uplink reference signal is SRS and the downlink reference signal is PRS.

In order to improve the accuracy of determining the transmission delay, in the embodiments of the present disclosure, receiving or transmitting of reference signal may be performed multiple times between the network device and the terminal device to measure the receiving or transmitting time of multiple groups of reference signals. Based on this, in the embodiments of the present disclosure, the network device may configure multiple reference signals for the terminal device, and for example, configure multiple uplink reference signals and multiple downlink reference signals for the terminal device. Optionally, the signal configuration information further includes binding relationships (or "correspondence relationships") between the uplink reference signals and the downlink reference signals. That is, when configuring the reference signals for the terminal device, the network device further configures the binding relationships between the uplink reference signals and the downlink reference signals. Therefore, on the one hand, when the terminal device has received a downlink reference signal, it can be clear to the terminal device that the RX-TX time difference is determined according to the receiving time of the downlink reference signal and the transmission time of which uplink reference signal. On the other hand, when the network device has received an uplink reference signal, it can also be clear to the network device that the RX-TX time difference is determined according to the receiving time of the uplink reference signal and the transmission time of which downlink reference signal.

Embodiments of the present disclosure do not limit the expression of the binding relationships, and the binding relationships may be explicitly indicated or implicitly indicated. Optionally, the above signal configuration information includes binding relationships between indices of uplink reference signals and indices of the downlink reference signals, such as a binding relationship between an SRS index and a PRS index. Or the signal configuration information includes a time interval (or "distances") between an uplink reference signal and a downlink reference signal having a binding relationship, such as an interval between a transmission time of an uplink reference signal and a transmission time of a downlink reference signal, a bitmap of the reference signal, and a mapping index of an uplink reference signal and a downlink reference signal at a specific position.

In an example, after receiving the signal configuration information, the terminal device performs receiving or transmitting of a reference signal with the network device. Exemplarily, the network device transmits a downlink reference signal to the terminal device or receives an uplink reference signal from the terminal device. The terminal device transmits an uplink reference signal to the network device or receives a downlink reference signal from the network device. The embodiments of the present disclosure do not limit the time when the network device transmits or receives the reference signal to or from the terminal device. Optionally, after transmitting the signal configuration information or after transmitting the signal configuration information for a period of time, the network device performs receiving or transmitting of reference signal with the terminal device. Or, when receiving the uplink reference signal from the terminal device, or after receiving the uplink reference signal from the terminal device, the network device performs receiving or transmitting of the reference signal with the terminal device.

To sum up, according to the technical solution provided by the embodiments of the present disclosure, a network device configures a reference signal for transmission delay compensation for a terminal device, and then the terminal device and the network device can determine a signal transmission delay based on the transmitting or receiving of the reference signal, or determine a transmission delay compensated in the transmission delay compensation, so as to further realize the compensation of the transmission delay of the signal transmitted between the terminal device and the network device. There is provided a method for compensating a transmission delay, which ensures the accurate synchronization between the terminal device and the network device. In addition, the technical solution provided by the embodiments of the present disclosure can be applied to the 5G system. As the transmission delay between the terminal device and the network device in the 5G system is compensated, the 5G system is ensured to have higher synchronization accuracy, thereby enabling the 5G system to meet the synchronization accuracy requirements required by TSN services.

In addition, in the embodiments of the present disclosure, there is provided multiple signal types of the reference signals, which enriches the signal types of the reference signals, and enables the network device to independently and flexibly configure the reference signals. In addition, in the embodiments of the present disclosure, the reference signal includes at least one of an uplink reference signal or a downlink reference signal, and the network device also configures a binding relationship between the uplink reference signal and the downlink reference signal for the terminal device. In this way, the terminal device and the network device can be clear that the determination basis of the RX-TX time difference respectively. For the terminal device, it can be clear that the RX-TX time difference is a time difference between the transmission time of which uplink reference signal and the receiving time of which downlink reference signal. For the network device, it can be clear that the RX-TX time difference is a time difference between the transmission time of which downlink reference signal and receiving time of which uplink reference signal. In this way, the accuracy of determining the RX-TX time difference is ensured, thereby improving the accuracy of determining the transmission delay.

In the embodiments of the present disclosure, the signal transmission delay between the terminal device and the network device or the transmission delay compensated in the transmission delay compensation can be determined by either the terminal device (where the terminal device is a computing entity) or the network device (where the network device is a computing entity). The following two cases are introduced and explained respectively.

Figure 5:
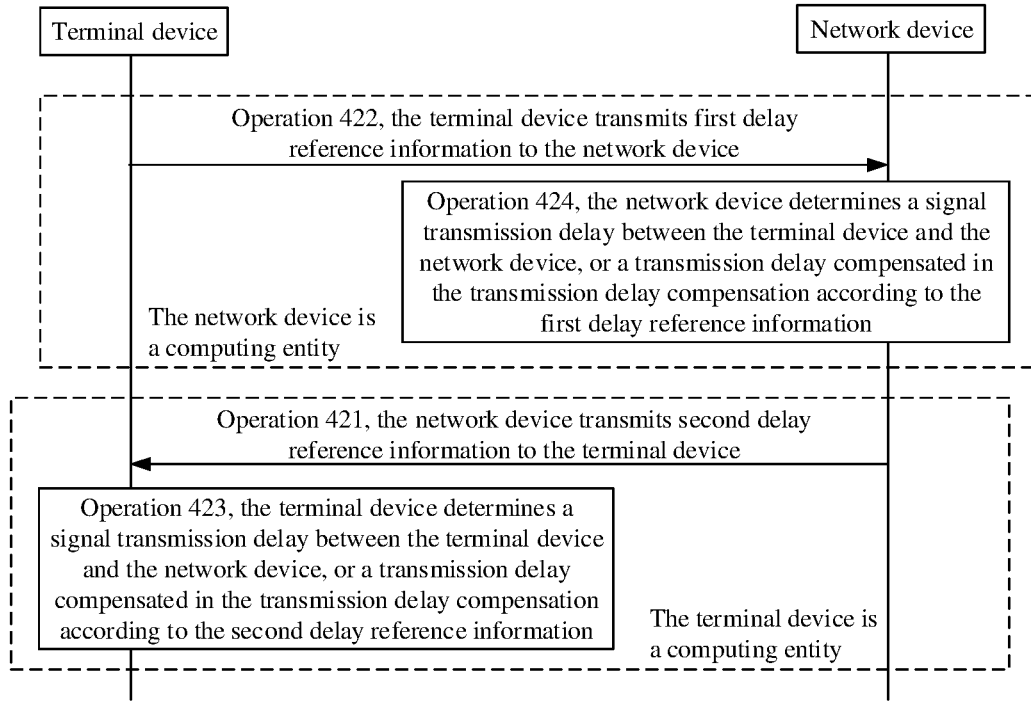
FIG. 5 is a flowchart of a process for determining a transmission delay provided by an embodiment of the present disclosure.

In an example, as illustrated in FIG. 5, the above method further includes the following operation 422 and operation 424.

At operation 422, the terminal device transmits first delay reference information to the network device.

When the network device is a computing entity, in order to ensure the accuracy of the signal transmission delay or the transmission delay to be compensated computed by the network device, the terminal device may transmit the first delay reference information to the network device, and the first delay reference information may be used to provide a reference for the network device to compute the signal transmission delay or the transmission delay to be compensated.

The first delay reference information is obtained by measuring the reference signal by the terminal device, such as measuring the transmission time of the uplink reference signal or the receiving time of the downlink reference signal. Based on this, in an example, the first delay reference information includes at least one of the following: a receiving time of the downlink reference signal, a transmission time of the uplink reference signal, a time difference between the receiving time of the downlink reference signal and the transmission time of the uplink reference signal, an index of the downlink reference signal, an index of the uplink reference signal, or a mapping index between the downlink reference signal and the uplink reference signal. Optionally, when measuring the RX-TX time difference, the terminal device measures the RX-TX time difference between the uplink and downlink reference signals having a binding relationship, such as measuring a time difference between a receiving time of a certain downlink reference signal and a transmission time of an uplink reference signal having a binding relationship with the downlink reference signal. Optionally, similar to the RX-TX time difference, when measuring a mapping index, the terminal device measures a mapping index between the uplink and downlink reference signals having a binding relationship.

The embodiments of the present disclosure do not limit the time when the terminal device transmits the first delay reference information. Optionally, the operation 422 includes that: the terminal device transmits the first delay reference information to the network device at a first time. The first time includes any one of the following: a receiving time of the downlink reference signal, a time after the receiving time of the downlink reference signal, a transmission time of the uplink reference signal, a time after the transmission time of the uplink reference signal, a second time, or a time after the second time. The second time is a time at which a time difference between the receiving time of the downlink reference signal and the transmission time of the uplink reference signal is determined. Optionally, the second time is a time at which the terminal device determines the RX-TX time difference between a group of uplink and downlink reference signals having the binding relationship. Optionally, the terminal device periodically transmits the first delay reference information to the network device. When the first delay reference information is periodically transmitted, the content of the first delay reference information transmitted by the terminal device each time may be the same or different. For example, first delay reference information transmitted by the terminal device for the first time includes the RX-TX time difference between the first uplink reference signal and the first downlink reference signal, and first delay reference information transmitted by the terminal device for the second time includes the RX-TX time difference between the second uplink reference signal and the second downlink reference signal. The value of the RX-TX time difference between the first uplink reference signal and the first downlink reference signal may be the same with or different from the value of the RX-TX time difference between the second uplink reference signal and the second downlink reference signal. Optionally, when multiple groups of uplink and downlink reference signals exist, the first uplink reference signal and the first downlink reference signal may be the same with or different from the second uplink reference signal and the second downlink reference signal. For another example, the first delay reference information transmitted by the terminal device for the first time includes the RX-TX time difference between a group of uplink and downlink reference signals, and the first delay reference information transmitted by the terminal device for the second time includes the RX-TX time difference between two groups of uplink and downlink reference signals. Optionally, the terminal device may not report the RX-TX time difference between the uplink and downlink reference signals or only report the RX-TX time difference between a group of uplink and downlink reference signals under the condition that the continuous RX-TX time differences are the same.

At operation 424, the network device determines a signal transmission delay between the terminal device and the network device, or a transmission delay compensated in the transmission delay compensation according to the first delay reference information.

After receiving the first delay reference information, the network device may determine the signal transmission delay or the transmission delay to be compensated according to the first delay reference information. Since the network device itself may also measure the reference signal, optionally, the network device may determine the signal transmission delay or the transmission delay to be compensated by combining the first delay reference information and the measurement result of the reference signal measured by the network device, thereby improving the accuracy of the delay determination result.

In the embodiments of the present disclosure, because the network device or the terminal device may perform a part of delay compensation when transmitting the uplink and downlink reference signals, the network device may not compute the actual transmission delay of the transmitted signals according to the first delay reference information, but the transmission delay that is actually to be compensated in the transmission delay compensation. Or, the network device computes a function of the transmission delay according to the first delay reference information, and the function of the transmission delay is the transmission delay that is actually to be compensated in the transmission delay compensation. Therefore, in the embodiments of the present disclosure, the network device determines, in a case, the signal transmission delay between the terminal device and the network device according to the first delay reference information, and optionally, the signal transmission delay includes at least one of the following: RTT or RX-TX Time Difference. In another case, the network device determines the transmission delay compensated in the transmission delay compensation according to the first delay reference information.

In another example, as illustrated in FIG. 5, the above method further includes the following operation 421 and operation 423.

At operation 421, the network device transmits second delay reference information to the terminal device.

When the terminal device is a computing entity, in order to ensure the accuracy of the signal transmission delay or the transmission delay to be compensated computed by the terminal device, the network device may transmit the second delay reference information to the terminal device, and the second delay reference information may be used to provide a reference for the terminal device to compute the signal transmission delay or the transmission delay to be compensated.

The second delay reference information is obtained by measuring the reference signal by the network device, such as measuring the receiving time of the uplink reference signal or the transmission time of the downlink reference signal. Based on this, in an example, the second delay reference information includes at least one of the following: a transmission time of the downlink reference signal, a receiving time of the uplink reference signal, a time difference between the transmission time of the downlink reference signal and the receiving time of the uplink reference signal, an index of the downlink reference signal, an index of the uplink reference signal, or a mapping index between the downlink reference signal and the uplink reference signal. Optionally, when measuring the RX-TX time difference, the network device measures the RX-TX time difference between the uplink and downlink reference signals having a binding relationship, such as measuring a time difference between a receiving time of a certain uplink reference signal and a transmission time of a downlink reference signal having a binding relationship with the uplink reference signal. Optionally, similar to the RX-TX time difference, when measuring a mapping index, the terminal device measures a mapping index between the uplink and downlink reference signals having a binding relationship.

The embodiments of the present disclosure do not limit the time when the network device transmits the second delay reference information. Optionally, the operation 421 includes that: the network device transmits the second delay reference information to the network device at a third time. The third time includes any one of the following: a transmission time of the downlink reference signal, a time after the transmission time of the downlink reference signal, a receiving time of the uplink reference signal, a time after the receiving time of the uplink reference signal, a fourth time, or a time after the fourth time. The fourth time is a time at which a time difference between the transmission time of the downlink reference signal and the receiving time of the uplink reference signal is determined. Optionally, the fourth time is a time at which the network device determines the RX-TX time difference between a group of uplink and downlink reference signals having the binding relationship. Optionally, the network device periodically transmits the second delay reference information to the terminal device. When the second delay reference information is periodically transmitted, the content of the second delay reference information transmitted by the network device each time may be the same or different. For example, second delay reference information transmitted by the network device for the first time includes the RX-TX time difference between the first uplink reference signal and the first downlink reference signal, and second delay reference information transmitted by the network device for the second time includes the RX-TX time difference between the second uplink reference signal and the second downlink reference signal. The value of the RX-TX time difference between the first uplink reference signal and the first downlink reference signal may be the same with or different from the value of the RX-TX time difference between the second uplink reference signal and the second downlink reference signal. Optionally, when multiple groups of uplink and downlink reference signals exist, the first uplink reference signal and the first downlink reference signal may be the same with or different from the second uplink reference signal and the second downlink reference signal. For example, the second delay reference information transmitted by the network device for the first time includes the RX-TX time difference between a group of uplink and downlink reference signals, and the second delay reference information transmitted by the network device for the second time includes the RX-TX time difference between two groups of uplink and downlink reference signals. Optionally, the network device may not report the RX-TX time difference between the uplink and downlink reference signals or only report the RX-TX time difference between a group of uplink and downlink reference signals under the condition that the continuous RX-TX time differences are the same.

At operation 423, the terminal device determines a signal transmission delay between the terminal device and the network device, or a transmission delay compensated in the transmission delay compensation according to the second delay reference information.

After receiving the second delay reference information, the terminal device may determine the signal transmission delay or the transmission delay to be compensated according to the second delay reference information. Since the terminal device itself may also measure the reference signal, optionally, the terminal device may determine the signal transmission delay or the transmission delay to be compensated by combining the second delay reference information and the measurement result of the reference signal measured by the terminal device, thereby improving the accuracy of the delay determination result.

In the embodiments of the present disclosure, because the network device or the terminal device may perform a part of delay compensation when transmitting the uplink and downlink reference signals, the terminal device may not compute the actual transmission delay of the transmitted signals according to the first delay reference information, but the transmission delay that is actually to be compensated in the transmission delay compensation. Or, the terminal device computes a function of the transmission delay according to the first delay reference information, and the function of the transmission delay is the transmission delay that is actually to be compensated in the transmission delay compensation. Therefore, in the embodiments of the present disclosure, the terminal device determines, in a case, the signal transmission delay between the terminal device and the network device according to the second delay reference information, and optionally, the signal transmission delay includes at least one of the following: RTT or transmission delay (one-half of the RTT). In another case, the terminal device determines the transmission delay compensated in the transmission delay compensation according to the second delay reference information.

In an example, the signal configuration information further includes: computing entity indication information. The computing entity indication information is used to indicate an entity that determines a signal transmission delay or a transmission delay to be compensated. The embodiments of the present disclosure do not limit the determination manner of the computing entity indication information, and the computing entity indication information may explicitly or implicitly indicate the computing entity. Optionally, the computing entity indication information includes a terminal device or a network device. For example, if the computing entity indication information includes a terminal device, the terminal device is the computing entity. Or, the computing entity indication information includes that the terminal device transmits the first delay reference information to the network device, or the network device transmits the second delay reference information to the terminal device. For example, if the computing entity indication information includes that the terminal device transmits the first delay reference information to the network device, the network device is the computing entity. Or, the computing entity indication information includes that the network device receives the first delay reference information, or the terminal device receives the second delay reference information. For example, if the computing entity indication information includes that the terminal device receives the second delay reference information, the terminal device is the computing entity. In another example, the computing entity is indicated by the network device transmitting a dedicated signaling, such as radio resource control (RRC) signaling, to the terminal device, and the manner in which the dedicated signaling indicates the computing entity can be referred to as the manner in which the computing entity indication information indicates the computing entity, which is not elaborated here. In yet another example, the computing entity is predefined by the communication protocol, and the manner in which the computing entity is defined by the communication protocol can be referred to as the manner in which the computing entity indication information indicates the computing entity, which is not elaborated here.

To sum up, according to the technical solution provided by the embodiments of the present disclosure, the reference signal is measured by the network device and the terminal device, and then the signal transmission delay or the transmission delay to be compensated is determined according to the measurement result, thereby providing a basis for performing the transmission delay compensation. In embodiments of the present disclosure, the signal transmission delay or the transmission delay to be compensated can be determined by the terminal device or the network device, which improves the flexibility of delay determination and is helpful to independently and flexibly select the delay determination subject according to actual requirements. For example, in the case of less available computing resources of the terminal device, the transmission delay can be determined by the network device without increasing the processing overhead of the terminal device.

After the signal transmission delay or the transmission delay to be compensated is determined, the transmission delay compensation may be performed either by the terminal device (where the terminal device is the compensation subject) or by the network device (where the network device is the compensation subject).

The following introduces and describes the two cases respectively.

Figure 6:
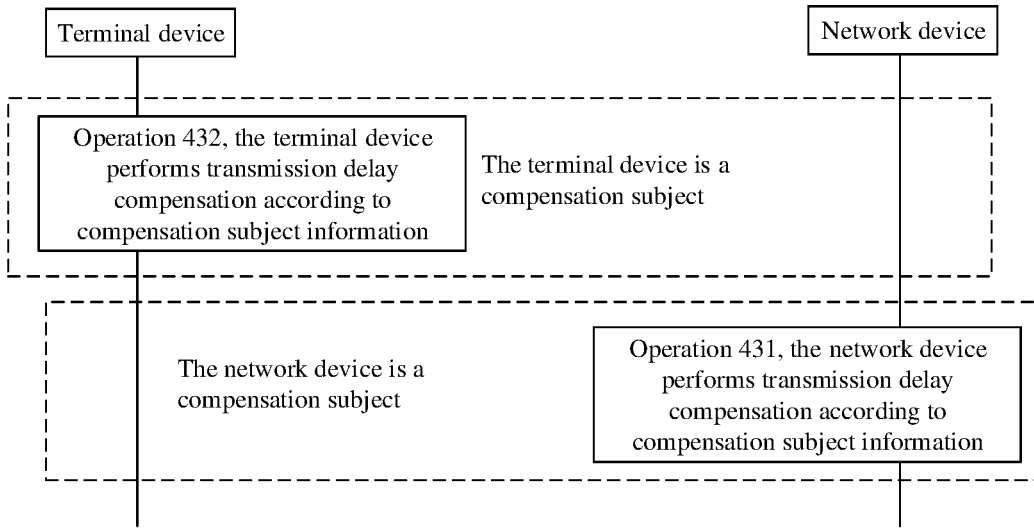
FIG. 6 is a flowchart of a process for compensating a transmission delay provided by an embodiment of the present disclosure.

In an example, as illustrated in FIG. 6, the method further includes operation 432. At operation 432, the terminal device performs the transmission delay compensation according to compensation subject information.

When the terminal device is determined as the compensation subject according to the compensation subject information, the terminal device performs transmission delay compensation. For example, the terminal device subtracts the signal transmission delay or the transmission delay to be compensated from the predicted transmission time of the signal to obtain actual transmission time of the signal, and determines the time, or performs synchronization or transmits the signal according to the actual transmission time, so as to achieve the purpose of transmission delay compensation and synchronization.

The compensation subject information is used to indicate a subject that performs transmission delay compensation. The embodiments of the present disclosure do not limit the carrying manner of the compensation subject information. Optionally, the compensation subject information includes at least one of the following: subject indication information from the network device, subject configuration information from the network device, or compensation subject information predefined by a communication protocol. When the compensation subject information includes the subject indication information, the subject indication information may be carried in the dedicated signaling, that is, the network device may indicate the compensation subject to the terminal device through the dedicated signaling (such as RRC signaling). When the compensation subject information includes the subject configuration information, the network device may configure the compensation subject for the terminal device. When the compensation subject information includes compensation subject information predefined by the communication protocol, the compensation subject is predefined by the communication protocol. The embodiments of the present disclosure do not limit the indication manner of the compensation subject information, and the compensation subject information may explicitly indicate the compensation subject or implicitly indicate the compensation subject. Optionally, the compensation subject information includes whether the terminal device performs transmission delay compensation or whether the network device performs transmission delay compensation. For example, in a case where the compensation subject information includes that the terminal device performs transmission delay compensation, the terminal device acts as the compensation subject, and the network device transmits the second delay reference information to the terminal device. For another example, in a case where the compensation subject information includes that the network device does not perform transmission delay compensation, the terminal device acts as the compensation subject, and the network device transmits the second delay reference information to the terminal device.

After determining that the compensation subject is the terminal device, the embodiments of the present disclosure do not limit the time for the terminal device to perform the transmission delay compensation. Optionally, when the computing entity is a terminal device, the terminal device performs the transmission delay compensation when determining the signal transmission delay or the signal transmission delay to be compensated. Or, when the computing entity is a terminal device, the terminal device performs transmission delay compensation when acquiring time information from the network device. Or, when the computing entity is a network device, the terminal device performs the transmission delay compensation when receiving the signal transmission delay or the transmission delay to be compensated determined by the network device. Or, when the computing entity is a network device, the terminal device performs the transmission delay compensation when receiving the signal transmission delay or the transmission delay and time information to be compensated determined by the network device. Or, the terminal device performs transmission delay compensation when the execution condition is satisfied. The execution condition includes at least one of the following: the signal transmission delay or the transmission delay to be compensated is acquired, indication information for indicating that the network device does not perform transmission delay compensation is received, indication information for indicating that the terminal device performs transmission delay compensation is received, a distance between the terminal device and the network device is greater than or equal to the first threshold, ISD (i.e., the distance from the center point to the edge of the serving cell) of the serving cell of the terminal device is greater than or equal to the second threshold, or the signal transmission delay or the signal transmission delay to be compensated is greater than or equal to the third threshold. Optionally, the time difference between the signal transmission delay actually computed by the terminal device and the acquired NW synchronization time (e.g. system frame number (SFN)) or the time difference between the signal transmission delay actually computed by the terminal device and the acquired NW information is less than or equal to the fourth threshold.

In another example, as illustrated in FIG. 6, the method further includes operation 431. At operation 431, the network device performs the transmission delay compensation according to compensation subject information.

When the network device is determined as the compensation subject according to the compensation subject information, the network device performs transmission delay compensation. For example, the network device subtracts the signal transmission delay or the transmission delay to be compensated from the predicted transmission time of the signal to obtain actual transmission time of the signal, and indicates the corresponding time information according to the actual transmission time, such as the actual time corresponding to the reference SFN, so as to achieve the purpose of transmission delay compensation and synchronization.

The compensation subject information is used to indicate a subject that performs transmission delay compensation. The embodiments of the present disclosure do not limit the carrying manner of the compensation subject information. Optionally, the compensation subject information includes at least one of the following: subject indication information of the network device, subject configuration information of the network device, or compensation subject information predefined by a communication protocol. When the compensation subject information includes the subject indication information, the subject indication information may be carried in the dedicated signaling, that is, the network device may indicate the compensation subject to the terminal device through the dedicated signaling (such as RRC signaling). When the compensation subject information includes the subject configuration information, the network device may configure the compensation subject for the terminal device. When the compensation subject information includes the compensation subject information predefined by the communication protocol, the compensation subject is predefined by the communication protocol. The embodiments of the present disclosure do not limit the indication manner of the compensation subject information, and the compensation subject information may explicitly indicate the compensation subject or implicitly indicate the compensation subject. Optionally, the compensation subject information includes whether the terminal device performs transmission delay compensation or whether the network device performs transmission delay compensation. For example, in a case where the compensation subject information includes that the network device performs transmission delay compensation, the network device acts as the compensation subject and the terminal device transmits the first delay reference information to the network device. For another example, in a case where the compensation subject information includes that the terminal device does not perform transmission delay compensation, the network device acts as the compensation subject and the terminal device transmits the first delay reference information to the network device.

After determining that the compensation subject is the network device, the embodiments of the present disclosure do not limit the time for the network device to perform the transmission delay compensation. Optionally, when the computing entity is the network device, the network device performs the transmission delay compensation when determining the signal transmission delay or the signal transmission delay to be compensated. Or, when the computing entity is a network device, the network device performs transmission delay compensation when acquiring time information from the terminal device. Or, when the computing entity is the terminal device, the network device performs the transmission delay compensation when receiving the signal transmission delay or the transmission delay to be compensated determined by the terminal device. Or, when the computing entity is a terminal device, the network device performs the transmission delay compensation when receiving the signal transmission delay or the transmission delay and time information to be compensated determined by the terminal device. Or, the network device performs transmission delay compensation when the execution condition is satisfied. The execution condition includes at least one of the following: the signal transmission delay or the transmission delay to be compensated is acquired, a distance between the terminal device and the network device is greater than or equal to the first threshold, ISD (i.e., the distance from the center point to the edge of the serving cell) of the serving cell of the terminal device is greater than or equal to the second threshold, or the signal transmission delay or the signal transmission delay to be compensated is greater than or equal to the third threshold. Optionally, the time difference between the signal transmission delay actually computed by the network device and the acquired NW synchronization time (e.g. SFN) or the time difference between the signal transmission delay actually computed by the network device and the acquired NW information is less than or equal to the fourth threshold.

In an example, the computing entity and the compensation subject are the same, for example, both the computing entity and the compensation subject are terminal devices or network devices. By computing the signal transmission delay or the transmission delay to be compensated by the same device and performing the transmission delay compensation, excessive information exchanges between the terminal device and the network device can be avoided. Or, the computing entity and the compensation subject are different. For example, the computing entity is a terminal device and the compensation subject is a network device. By computing the signal transmission delay or the transmission delay to be compensated by a device and performing the transmission delay compensation by another device, it is helpful to disperse and balance the processing overhead.

To sum up, according to the technical solution provided by the embodiments of the present disclosure, the compensation subject of transmission delay compensation is determined based on compensation subject information. The compensation subject may be indicated to the terminal device by the network device through dedicated signaling, or may also be configured for the terminal device by the network device through configuration information, or may also be predefined by the communication protocol, thereby enriching the determination manner of the compensation subject and improving the flexibility of selecting the compensation subject.

The following two examples are used to introduce the technical solution of the present disclosure.

Figure 7:
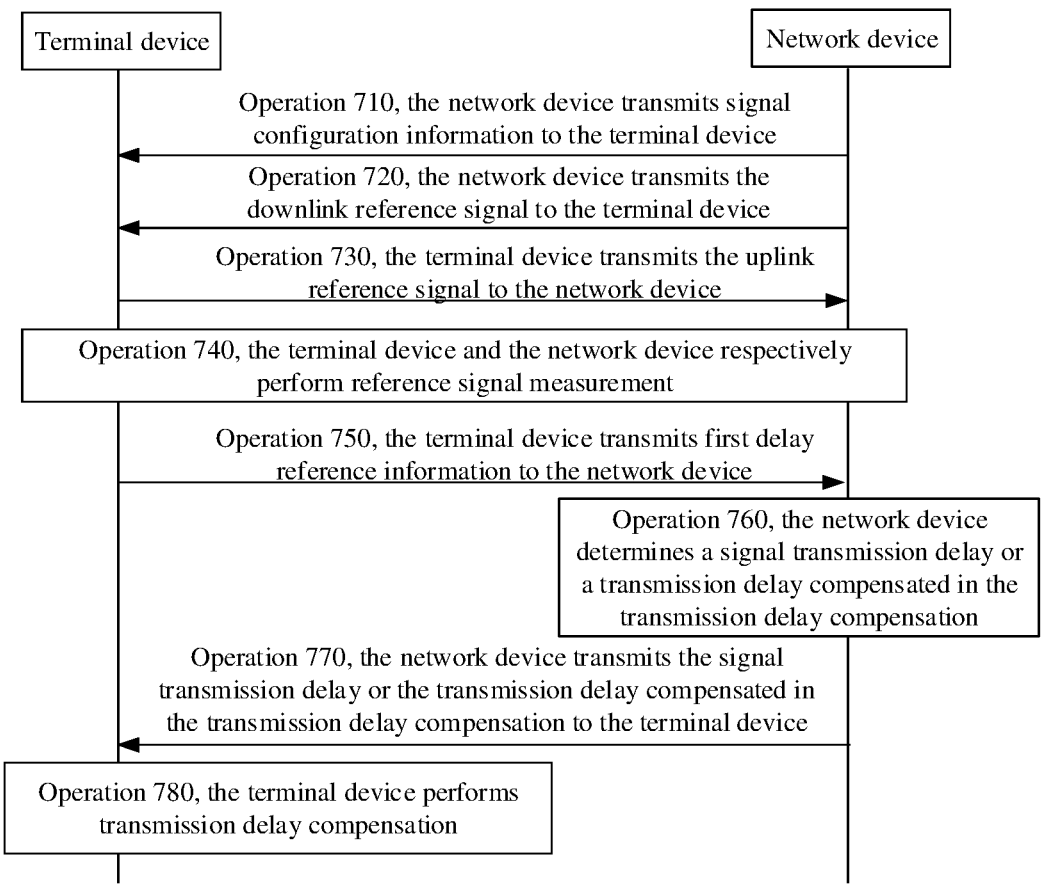
FIG. 7 is a flowchart of a method for compensating a transmission delay provided by another embodiment of the present disclosure.

Referring to FIG. 7, FIG. 7 is a flowchart of a method for compensating a transmission delay provided by an embodiment of the present disclosure. The method can be applied to the system architecture illustrated in FIG. 1. The method may include the following operation 710 to operation 780.

At operation 710, the network device transmits signal configuration information to the terminal device. The signal configuration information is used to configure a reference signal for transmission delay compensation between the terminal device and the network device. The reference signal includes at least one of an uplink reference signal or a downlink reference signal.

At operation 720, the network device transmits the downlink reference signal to the terminal device. Optionally, the downlink reference signal includes at least one of the following: PRS, CSI-RS, SSB, CRS, DMRS or TRS.

At operation 730, the terminal device transmits the uplink reference signal to the network device. Optionally, the uplink reference signal includes at least one of the following: SRS, preamble, DMRS, PRS, TRS or CSI-RS.

It should be noted that the embodiment of the present disclosure does not limit the sequence of execution of operation 720 and operation 730. Optionally, operation 720 and operation 730 are executed simultaneously, or operation 720 is executed after operation 730, or operation 720 is executed before operation 730. It also should be noted that the embodiments of the present disclosure do not limit the execution times of operation 720 and operation 730. Optionally, both operation 720 and operation 730 are executed periodically.

At operation 740, the terminal device and the network device respectively perform reference signal measurement. Optionally, the reference signal measurement includes measuring an RX-TX time difference between the uplink and downlink reference signals, for example, for the terminal device, the reference signal measurement includes measuring a time difference between the transmission time of the uplink reference signal and the receiving time of the downlink reference signal.

At operation 750, the terminal device transmits first delay reference information to the network device. Optionally, the first delay reference information includes at least one of the following: a receiving time of the downlink reference signal, a transmission time of the uplink reference signal, a time difference between the receiving time of the downlink reference signal and the transmission time of the uplink reference signal, an index of the downlink reference signal, an index of the uplink reference signal, or a mapping index between the downlink reference signal and the uplink reference signal.

At operation 760, the network device determines a signal transmission delay or a transmission delay compensated in the transmission delay compensation. Optionally, the network device determines the signal transmission delay or the transmission delay compensated in the transmission delay compensation in combination with the first delay reference information transmitted by the terminal device and the measurement result of the reference signal by the network device.

At operation 770, the network device transmits the signal transmission delay or the transmission delay compensated in the transmission delay compensation to the terminal device.

At operation 780, the terminal device performs transmission delay compensation. For example, the terminal device subtracts the signal transmission delay or the transmission delay to be compensated from predicted transmission time of a signal to obtain actual transmission time of the signal, and transmits the signal according to the actual transmission time, so as to achieve the purpose of transmission delay compensation.

Figure 8:
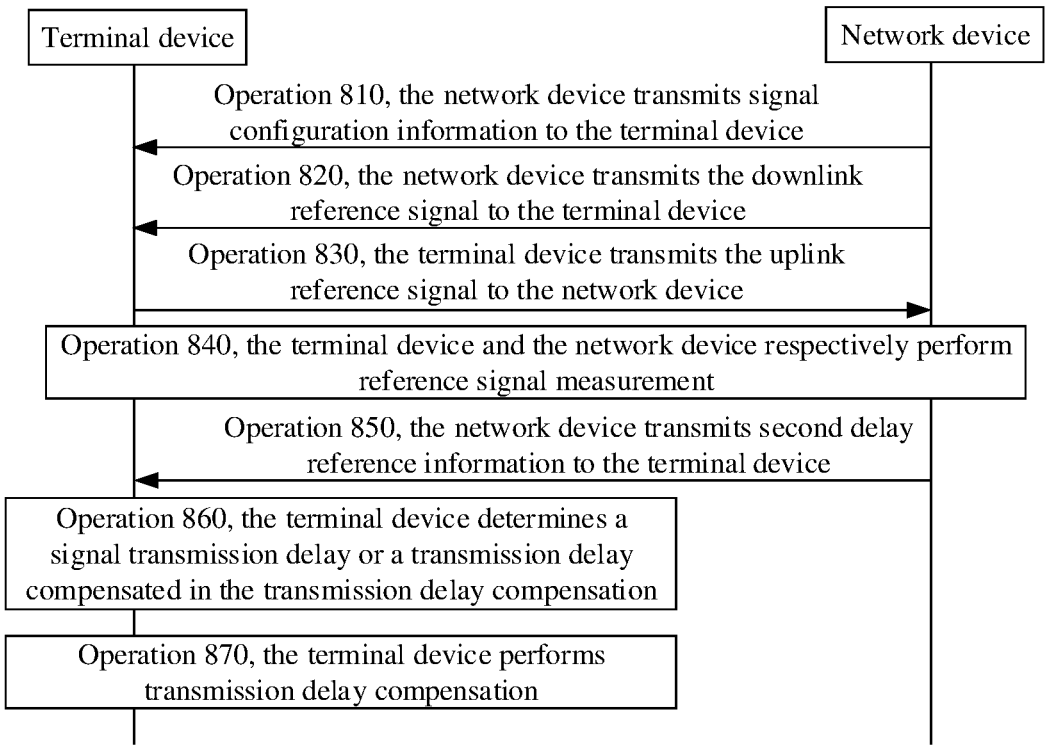
FIG. 8 is a flowchart of a method for compensating a transmission delay provided by yet another embodiment of the present disclosure.

Referring to FIG. 8, FIG. 8 is a flowchart of a method for compensating a transmission delay provided by an embodiment of the present disclosure. The method can be applied to the system architecture illustrated in FIG. 1. The method may include the following operation 810 to operation 870.

At operation 810, the network device transmits signal configuration information to the terminal device. The signal configuration information is used to configure a reference signal for transmission delay compensation between the terminal device and the network device. The reference signal includes at least one of an uplink reference signal or a downlink reference signal.

At operation 820, the network device transmits the downlink reference signal to the terminal device. Optionally, the downlink reference signal includes at least one of the following: PRS, CSI-RS, SSB, CRS, DMRS or TRS.

At operation 830, the terminal device transmits the uplink reference signal to the network device. Optionally, the uplink reference signal includes at least one of the following: SRS, preamble, DMRS, PRS, TRS or CSI-RS.

It should be noted that the embodiment of the present disclosure does not limit the sequence of execution of operation 820 and operation 830. Optionally, operation 820 and operation 830 are executed simultaneously, or operation 820 is executed after operation 830, or operation 820 is executed before operation 830. It also should be noted that the embodiments of the present disclosure do not limit the execution times of operation 820 and operation 830. Optionally, both operation 820 and operation 830 are executed periodically.

At operation 840, the terminal device and the network device respectively perform reference signal measurement. Optionally, the reference signal measurement includes measuring a RX-TX time difference between the uplink and downlink reference signals, for example, for the network device, the reference signal measurement includes measuring a time difference between the receiving time of the uplink reference signal and the transmission time of the downlink reference signal.

At operation 850, the network device transmits the second delay reference information to the terminal device. Optionally, the second delay reference information includes at least one of the following: a transmission time of the downlink reference signal, a receiving time of the uplink reference signal, a time difference between the transmission time of the downlink reference signal and the receiving time of the uplink reference signal, an index of the downlink reference signal, an index of the uplink reference signal, or a mapping index between the downlink reference signal and the uplink reference signal.

At operation 860, the terminal device determines a signal transmission delay or a transmission delay compensated in the transmission delay compensation. Optionally, the terminal device determines the signal transmission delay or the transmission delay compensated in the transmission delay compensation in combination with the second delay reference information transmitted by the network device and the measurement result of the reference signal by the terminal device.

At operation 870, the terminal device performs transmission delay compensation. For example, the terminal device subtracts the signal transmission delay or the transmission delay to be compensated from the predicted transmission time of a signal to obtain actual transmission time of the signal, and transmits the signal according to the actual transmission time, so as to achieve the purpose of transmission delay compensation.

It should be noted that in the above method embodiments, the method for compensating a transmission delay provided by the present disclosure is mainly introduced and explained from the perspective of interaction between terminal device and network device. The operations executed by the terminal device can be realized separately as a method for compensating a transmission delay on the terminal device side. The operations executed by the network device can be realized separately as a method for compensating a transmission delay on the network device side.

The following is embodiments of the apparatus of the present disclosure, which can be used to execute the embodiments of the method of the present disclosure. For details not disclosed in the apparatus embodiments of the present disclosure, reference is made to the method embodiments of the present disclosure.

Figure 9:
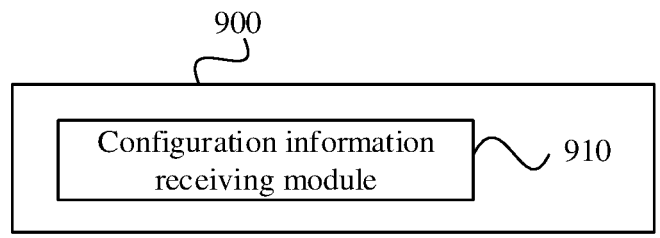
FIG. 9 is a block diagram of an apparatus for compensating a transmission delay provided by an embodiment of the present disclosure.

Referring to FIG. 9, FIG. 9 is a block diagram of an apparatus for compensating a transmission delay provided by an embodiment of the present disclosure. The apparatus has a function of realizing the method examples on the terminal device side described above, and this function can be realized by hardware, or can also be realized by hardware executing corresponding software. The apparatus may be the terminal device described above or may be provided in the terminal device. As illustrated in FIG. 9, the apparatus 900 may include a configuration information receiving module 910.

The configuration information receiving module 910 is configured to receive signal configuration information from a network device, the signal configuration information being used to configure a reference signal for transmission delay compensation between the terminal device and the network device. The reference signal includes at least one of an uplink reference signal or a downlink reference signal.

In an example, the uplink reference signal includes at least one of the following: SRS, preamble or DMRS.

In an example, the downlink reference signal includes at least one of the following: PRS, CSI-RS, SSB, CRS, DMRS or TRS.

In an example, the signal configuration information further includes a binding relationship between the uplink reference signal and the downlink reference signal.

Figure 10:
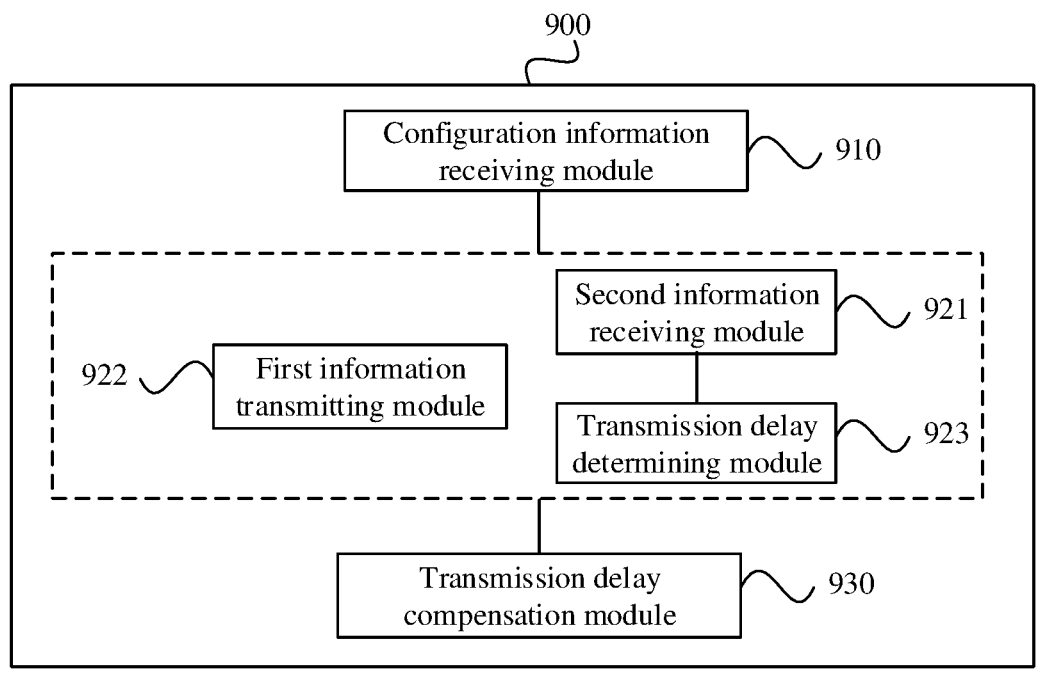
FIG. 10 is a block diagram of an apparatus for compensating a transmission delay provided by another embodiment of the present disclosure.

In an example, as illustrated in FIG. 10, the apparatus 900 further includes a first information transmitting module 922. The first information transmitting module 922 is configured to transmit first delay reference information to the network device, the first delay reference information being used to determine a signal transmission delay between the terminal device and the network device, or a transmission delay compensated in the transmission delay compensation.

In an example, the first delay reference information includes at least one of the following: a receiving time of the downlink reference signal, a transmission time of the uplink reference signal, a time difference between the receiving time of the downlink reference signal and the transmission time of the uplink reference signal, an index of the downlink reference signal, an index of the uplink reference signal, or a mapping index between the downlink reference signal and the uplink reference signal.

In an example, as illustrated in FIG. 10, the first information transmitting module 922 is configured to transmit the first delay reference information to the network device at a first time. The first time includes any one of the following: a receiving time of the downlink reference signal, a time after the receiving time of the downlink reference signal, a transmission time of the uplink reference signal, a time after the transmission time of the uplink reference signal, a second time, or a time after the second time. The second time is a time at which a time difference between the receiving time of the downlink reference signal and the transmission time of the uplink reference signal is determined.

In an example, the terminal device periodically transmits the first delay reference information to the network device.

In an example, as illustrated in FIG. 10, the apparatus 900 further includes a second information receiving module 921 and a transmission delay determining module 923. The second information receiving module 921 is configured to receive second delay reference information from the network device. The transmission delay determining module 923 is configured to determine a signal transmission delay between the terminal device and the network device, or a transmission delay compensated in the transmission delay compensation according to the second delay reference information.

In an example, the second delay reference information includes at least one of the following: a transmission time of the downlink reference signal, a receiving time of the uplink reference signal, a time difference between the transmission time of the downlink reference signal and the receiving time of the uplink reference signal, an index of the downlink reference signal, an index of the uplink reference signal, or a mapping index between the downlink reference signal and the uplink reference signal.

In an example, as illustrated in FIG. 10, the apparatus further includes a transmission delay compensation module 930, and the transmission delay compensation module 930 is configured to perform the transmission delay compensation according to compensation subject information.

In an example, the compensation subject information includes at least one of the following: subject indication information from the network device, subject configuration information from the network device, or compensation subject information predefined by a communication protocol.

In an example, the network device is a network device corresponding to a serving cell of the terminal device.

In an example, the terminal device satisfies at least one of the following conditions: having high precision transmission requirement, supporting transmission of a TSN service, or supporting transmission of a gPTP message.

To sum up, according to the technical solution provided by the embodiments of the present disclosure, a network device configures a reference signal for transmission delay compensation is configured for a terminal device, and then the terminal device and the network device can determine a signal transmission delay based on the transmitting or receiving of the reference signal, or determine a transmission delay compensated in the transmission delay compensation, so as to further realize the compensation of the transmission delay of the signal transmitted between the terminal device and the network device. There is provided a method for compensating a transmission delay, which ensures the accurate synchronization between the terminal device and the network device. In addition, the technical solution provided by the embodiments of the present disclosure can be applied to the 5G system. As the transmission delay between the terminal device and the network device in the 5G system is compensated, the 5G system is ensured to have higher synchronization accuracy, thereby enabling the 5G system to meet the synchronization accuracy requirements required by TSN services.

Figure 11:
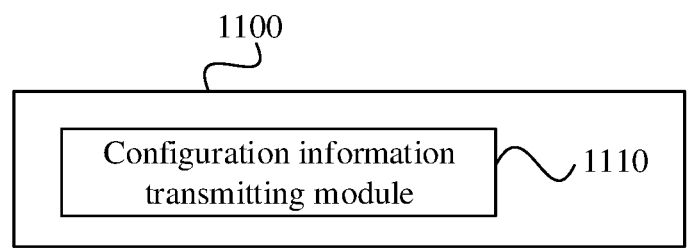
FIG. 11 is a block diagram of an apparatus for compensating a transmission delay provided by yet another embodiment of the present disclosure.

Referring to FIG. 11, FIG. 11 is a block diagram of an apparatus for compensating a transmission delay provided by an embodiment of the present disclosure. The apparatus has a function of realizing the method example on the network device side described above, this function can be realized by hardware, and can also be realized by hardware executing corresponding software. The apparatus may be the network device described above or may be provided in the network device. As illustrated in FIG. 11, the apparatus 1100 may include a configuration information transmitting module 1110.

The configuration information transmitting module 1110 is configured to transmit signal configuration information to the terminal device, the signal configuration information being used to configure a reference signal for transmission delay compensation between the terminal device and the network device. The reference signal includes at least one of an uplink reference signal or a downlink reference signal.

In an example, the uplink reference signal includes at least one of the following: SRS, preamble or DMRS.

In an example, the downlink reference signal includes at least one of the following: PRS, CSI-RS, SSB, CRS, DMRS or TRS.

In an example, the signal configuration information further includes a binding relationship between the uplink reference signal and the downlink reference signal.

Figure 12:
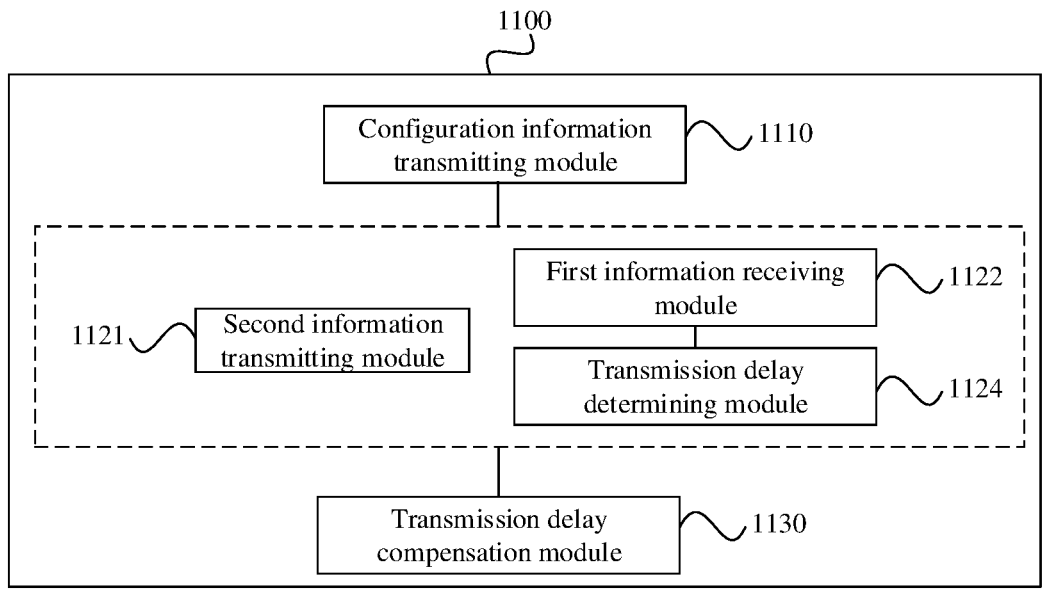
FIG. 12 is a block diagram of an apparatus for compensating a transmission delay provided by still another embodiment of the present disclosure.

In an example, as illustrated in FIG. 12, the apparatus 1100 further includes a first information receiving module 1122 and a transmission delay determining module 1124. The first information receiving module 1122 is configured to receive first delay reference information from the terminal device. The transmission delay determining module 1124 is configured to determine a signal transmission delay between the terminal device and the network device, or a transmission delay compensated in the transmission delay compensation according to the first delay reference information.

In an example, the first delay reference information includes at least one of the following: a receiving time of the downlink reference signal, a transmission time of the uplink reference signal, a time difference between the receiving time of the downlink reference signal and the transmission time of the uplink reference signal, an index of the downlink reference signal, an index of the uplink reference signal, or a mapping index between the downlink reference signal and the uplink reference signal.

In an example, as illustrated in FIG. 12, the apparatus 1100 further includes a second information transmitting module 1121. The second information transmitting module 1121 is configured to transmit second delay reference information to the terminal device, the second delay reference information being used to determine a signal transmission delay between the terminal device and the network device, or a transmission delay compensated in the transmission delay compensation.

In an example, the second delay reference information includes at least one of the following: a transmission time of the downlink reference signal, a receiving time of the uplink reference signal, a time difference between the transmission time of the downlink reference signal and the receiving time of the uplink reference signal, an index of the downlink reference signal, an index of the uplink reference signal, or a mapping index between the downlink reference signal and the uplink reference signal.

In an example, as illustrated in FIG. 12, the second information transmitting module 1121 is configured to transmit the second delay reference information to the terminal device at a third time. The third time includes any one of the following: a transmission time of the downlink reference signal, a time after the transmission time of the downlink reference signal, a receiving time of the uplink reference signal, a time after the receiving time of the uplink reference signal, a fourth time, or a time after the fourth time. The fourth time is a time at which a time difference between the transmission time of the downlink reference signal and the receiving time of the uplink reference signal is determined.

In an example, the network device periodically transmits the second delay reference information to the terminal device.

In an example, as illustrated in FIG. 12, the apparatus 1100 further includes a transmission delay compensation module 1130, and the transmission delay compensation module 1130 is configured to perform the transmission delay compensation according to compensation subject information.

In an example, the compensation subject information includes at least one of the following: subject indication information of the network device, subject configuration information of the network device, or compensation subject information predefined by a communication protocol.

In an example, the network device is a network device corresponding to a serving cell of the terminal device.

In an example, the terminal device satisfies at least one of the following conditions: having high precision transmission requirement, supporting transmission of a TSN service, or supporting transmission of a gPTP message.

To sum up, according to the technical solution provided by the embodiments of the present disclosure, a network device configures a reference signal for transmission delay compensation is configured for a terminal device, and then the terminal device and the network device can determine a signal transmission delay based on the transmitting or receiving of the reference signal, or determine a transmission delay compensated in the transmission delay compensation, so as to further realize the compensation of the transmission delay of the signal transmitted between the terminal device and the network device. There is provided a method for compensating a transmission delay, which ensures the accurate synchronization between the terminal device and the network device. In addition, the technical solution provided by the embodiments of the present disclosure can be applied to the 5G system. As the transmission delay between the terminal device and the network device in the 5G system is compensated, the 5G system is ensured to have higher synchronization accuracy, thereby enabling the 5G system to meet the synchronization accuracy requirements required by TSN services.

It should be noted that when the apparatus provided by the above embodiments realizes its function, it is only illustrated by the division of the above functional modules. In practical application, the above functions can be assigned by different functional modules according to actual needs, that is, the content structure of the device is divided into different functional modules to complete all or part of the functions described above.

With regard to the apparatus in the above embodiments, the specific manner in which the respective modules perform operations has been described in detail in the embodiments related to the method and will not be explained in detail herein.

Figure 13:
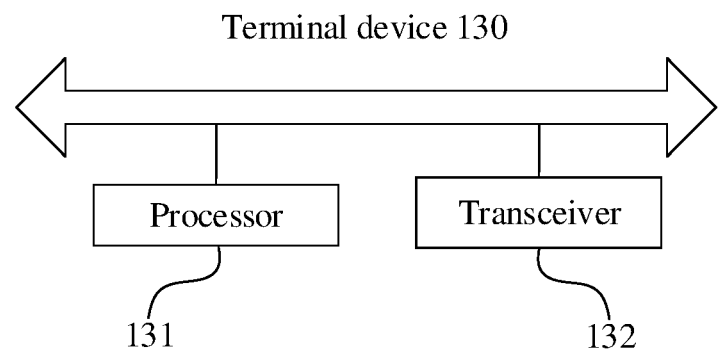
FIG. 13 is a structural diagram of a terminal device provided by an embodiment of the present disclosure.

Referring to FIG. 13, FIG. 13 is a schematic diagram of the structure of a terminal device 130 provided by an embodiment of the present disclosure. For example, the terminal device 130 may be used to implement the method for compensating a transmission delay on the terminal device side described above. Specifically, the terminal device 130 may include a processor 131 and a transceiver 132 connected to the processor 131.

The processor 131 includes one or more processing cores and executes various functional applications and information processing by running software programs and modules.

The transceiver 132 includes a receiver and a transmitter. Optionally, the transceiver 132 is a communication chip.

In an example, the terminal device 130 further includes a memory and a bus. The memory is connected to the processor through the bus. The memory may be configured to store a computer program, and the processor is configured to execute the computer program to implement the various operations executed by the terminal device in the method embodiments described above.

Further, the memory may be implemented by any type of volatile or non-volatile storage device or a combination thereof. Volatile or non-volatile storage devices include, but are not limited to: a random access memory (RAM) and a read-only memory (ROM), an erasable programmable read-only memory (EPROM), an electrically erasable programmable read-only memory (EEPROM), a flash memory or other solid-state memory technology, compact disc read-only memory (CD-ROM), digital video disc (DVD) or other optical storage, magnetic tape cassette, magnetic tape, magnetic disk storage or other magnetic storage devices.

The transceiver 132 is configured to receive signal configuration information from a network device, the signal configuration information being used to configure a reference signal for transmission delay compensation between the terminal device and the network device. The reference signal includes at least one of an uplink reference signal or a downlink reference signal.

In an example, the uplink reference signal includes at least one of the following: SRS, preamble or DMRS.

In an example, the downlink reference signal includes at least one of the following: PRS, CSI-RS, SSB, CRS, DMRS or TRS.

In an example, the signal configuration information further includes a binding relationship between the uplink reference signal and the downlink reference signal.

In an example, the transceiver 132 is configured to transmit first delay reference information to the network device, the first delay reference information being used to determine a signal transmission delay between the terminal device and the network device, or a transmission delay compensated in the transmission delay compensation.

In an example, the first delay reference information includes at least one of the following: a receiving time of the downlink reference signal, a transmission time of the uplink reference signal, a time difference between the receiving time of the downlink reference signal and the transmission time of the uplink reference signal, an index of the downlink reference signal, an index of the uplink reference signal, or a mapping index between the downlink reference signal and the uplink reference signal.

In an example, the transceiver 132 is configured to transmit the first delay reference information to the network device at a first time. The first time includes any one of the following: a receiving time of the downlink reference signal, a time after the receiving time of the downlink reference signal, a transmission time of the uplink reference signal, a time after the transmission time of the uplink reference signal, a second time, or a time after the second time. The second time is a time at which a time difference between the receiving time of the downlink reference signal and the transmission time of the uplink reference signal is determined.

In an example, the terminal device periodically transmits the first delay reference information to the network device.

In an example, the transceiver 132 is configured to receive second delay reference information from the network device. The processor 131 is configured to determine a signal transmission delay between the terminal device and the network device, or a transmission delay compensated in the transmission delay compensation according to the second delay reference information.

In an example, the second delay reference information includes at least one of the following: a transmission time of the downlink reference signal, a receiving time of the uplink reference signal, a time difference between the transmission time of the downlink reference signal and the receiving time of the uplink reference signal, an index of the downlink reference signal, an index of the uplink reference signal, or a mapping index between the downlink reference signal and the uplink reference signal.

In an example, the processor 131 is configured to perform the transmission delay compensation according to compensation subject information.

In an example, the compensation subject information includes at least one of the following: subject indication information from the network device, subject configuration information from the network device, or compensation subject information predefined by a communication protocol.

In an example, the network device is a network device corresponding to a serving cell of the terminal device.

In an example, the terminal device satisfies at least one of the following conditions: having high precision transmission requirement, supporting transmission of a TSN service, or supporting transmission of a gPTP message.

Figure 14:
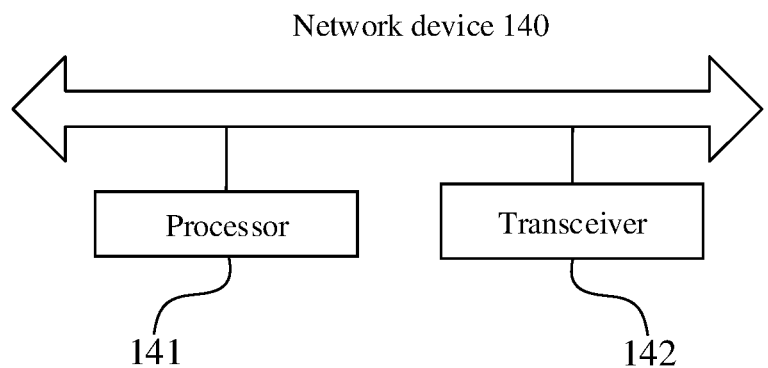
FIG. 14 is a structural diagram of a network device provided by an embodiment of the present disclosure.

Referring to FIG. 14, FIG. 14 is a schematic diagram of the structure of the network device 140 provided by an embodiment of the present disclosure. For example, the network device 130 may be used to implement the method for compensating a transmission delay on the network device side described above. Specifically, the network device 140 may include a processor 141 and a transceiver 142 connected to the processor 141.

The processor 141 includes one or more processing cores and executes various functional applications and information processing by running software programs and modules.

The transceiver 142 includes a receiver and a transmitter. Optionally, the transceiver 142 is a communication chip.

In an example, the network device 140 further includes a memory and a bus. The memory is connected to the processor through the bus. The memory may be configured to store a computer program, and the processor is configured to execute the computer program to implement the various operations executed by the network device in the method embodiments described above.

Further, the memory may be implemented by any type of volatile or non-volatile storage device or a combination thereof. Volatile or non-volatile storage devices include, but are not limited to: RAM and ROM, EPROM, EEPROM, flash memory or other solid-state memory technology, CD-ROM, DVD or other optical storage, magnetic tape cassette, magnetic tape, magnetic disk storage or other magnetic storage devices.

The transceiver 142 is configured to transmit signal configuration information to the terminal device, the signal configuration information being used to configure a reference signal for transmission delay compensation between the terminal device and the network device. The reference signal includes at least one of an uplink reference signal or a downlink reference signal.

In an example, the uplink reference signal includes at least one of the following: SRS, preamble or DMRS.

In an example, the downlink reference signal includes at least one of the following: PRS, CSI-RS, SSB, CRS, DMRS or TRS.

In an example, the signal configuration information further includes a binding relationship between the uplink reference signal and the downlink reference signal.

In an example, the transceiver 142 is configured to receive first delay reference information from the terminal device. The processor 141 is configured to determine a signal transmission delay between the terminal device and the network device, or a transmission delay compensated in the transmission delay compensation according to the first delay reference information.

In an example, the first delay reference information includes at least one of the following: a receiving time of the downlink reference signal, a transmission time of the uplink reference signal, a time difference between the receiving time of the downlink reference signal and the transmission time of the uplink reference signal, an index of the downlink reference signal, an index of the uplink reference signal, or a mapping index between the downlink reference signal and the uplink reference signal.

In an example, the transceiver 142 is configured to transmit second delay reference information to the terminal device, the second delay reference information being used to determine a signal transmission delay between the terminal device and the network device, or a transmission delay compensated in the transmission delay compensation.

In an example, the second delay reference information includes at least one of the following: a transmission time of the downlink reference signal, a receiving time of the uplink reference signal, a time difference between the transmission time of the downlink reference signal and the receiving time of the uplink reference signal, an index of the downlink reference signal, an index of the uplink reference signal, or a mapping index between the downlink reference signal and the uplink reference signal.

In an example, the transceiver 142 is configured to transmit the second delay reference information to the terminal device at a third time. The third time includes any one of the following: a transmission time of the downlink reference signal, a time after the transmission time of the downlink reference signal, a receiving time of the uplink reference signal, a time after the receiving time of the uplink reference signal, a fourth time, or a time after the fourth time. The fourth time is a time at which a time difference between the transmission time of the downlink reference signal and the receiving time of the uplink reference signal is determined.

In an example, the network device periodically transmits the second delay reference information to the terminal device.

In an example, the processor 141 is configured to perform the transmission delay compensation according to compensation subject information.

In an example, the compensation subject information includes at least one of the following: subject indication information of the network device, subject configuration information of the network device, or compensation subject information predefined by a communication protocol.

In an example, the network device is a network device corresponding to a serving cell of the terminal device.

In an example, the terminal device satisfies at least one of the following conditions: having high precision transmission requirement, supporting a transmission of a TSN service, or supporting a transmission of a gPTP message.

In an embodiment of the present disclosure, there is also provided a computer-readable storage medium, having stored thereon a computer program, wherein the computer program is configured to be executed by a processor of a terminal device to implement the method for compensating a transmission delay on the terminal device side as described above.

In an embodiment of the present disclosure, there is also provided a computer-readable storage medium, having stored thereon a computer program, wherein the computer program is configured to be executed by a processor of a network device to implement the method for compensating a transmission delay on the network device side as described above.

In an embodiment of the present disclosure, there is also provided a chip, including a programmable logic circuit and/or program instructions, wherein the chip, when running on a terminal device, implements the method for compensating a transmission delay on the terminal device side as described above.

In an embodiment of the present disclosure, there is also provided a chip, including a programmable logic circuit and/or program instructions, wherein the chip, when running on a network device, implements the method for compensating a transmission delay on the network device side as described above.

There is also provided a computer program product in an embodiment of the present disclosure, wherein the computer program product, when running on the terminal device, causes a computer to implement the method for compensating a transmission delay on the terminal device side as described above.

There is also provided a computer program product in an embodiment of the present disclosure, wherein the computer program product, when running on the network device, causes a computer to implement the method for compensating a transmission delay on the network device side as described above.

Those skilled in the art will appreciate that in one or more of the above examples, the functions described in embodiments of the present disclosure may be implemented in hardware, software, firmware or any combination thereof. When implemented in software, these functions may be stored in a computer-readable medium or transmitted as one or more instructions or codes on the computer-readable medium. The computer-readable medium includes a computer storage medium and a communication medium; herein the communication medium includes any medium that facilitates the transfer of a computer program from one place to another. The storage medium may be any available medium accessible to a general-purpose or special-purpose computer.

The above description is only exemplary embodiments of the present disclosure and is not intended to limit the present disclosure. All modifications, replacements and improvements made within the spirit and principles of the present disclosure should be included within the scope of protection of the present disclosure.

The invention claimed is:

1. A method for compensating a transmission delay, applied to a terminal device, the method comprising:
   receiving signal configuration information from a network device, the signal configuration information being used to configure a reference signal for transmission delay compensation between the terminal device and the network device,
   wherein the reference signal comprises at least one of an uplink reference signal or a downlink reference signal; and
   periodically transmitting first delay reference information to the network device, the first delay reference information being used to determine a signal transmission delay between the terminal device and the network device, or a transmission delay compensated in the transmission delay compensation, so as to achieve synchronization between the terminal device and the network device,
   wherein the first delay reference information comprises a time difference between the receiving time of the downlink reference signal and the transmission time of the uplink reference signal.

2. The method of claim 1, wherein the uplink reference signal comprises at least one of the following: a sounding reference signal (SRS), a preamble, or a demodulation reference signal (DMRS).

3. The method of claim 1, wherein the downlink reference signal comprises at least one of the following: a positioning reference signal (PRS), a channel state information reference signal (CSI-RS), a synchronization signal block (SSB), a cell reference signal (CRS), a DMRS, or a tracking reference signal (TRS).

4. The method of claim 1, wherein the signal configuration information further comprises a binding relationship between the uplink reference signal and the downlink reference signal, wherein the binding relationship is explicitly indicated by a bitmap of the reference signal, or a mapping index of an uplink reference signal and a downlink reference signal at a specific position.

5. The method of claim 1, wherein the first delay reference information further comprises at least one of the following: a receiving time of the downlink reference signal, a transmission time of the uplink reference signal, an index of the uplink reference signal, or a mapping index between the downlink reference signal and the uplink reference signal.

6. The method of claim 1, further comprising:
performing the transmission delay compensation according to compensation subject information.

7. The method of claim 6, wherein the compensation subject information comprises at least one of the following: subject indication information from the network device, subject configuration information from the network device, or compensation subject information predefined by a communication protocol.

8. The method of claim 7, wherein the compensation subject information implicitly indicates a compensation subject, and in a case where the compensation subject information includes that the terminal device performs the transmission delay compensation, the terminal device acts as the compensation subject and receives the second delay reference delay reference information from the network device.

9. A terminal device, comprising: a processor and a transceiver, wherein the transceiver is configured to:
receive signal configuration information from a network device, the signal configuration information being used to configure a reference signal for transmission delay compensation between the terminal device and the network device,
wherein the reference signal comprises at least one of an uplink reference signal or a downlink reference signal,
wherein the transceiver is further configured to:
periodically transmit first delay reference information to the network device, the first delay reference information being used to determine a signal transmission delay between the terminal device and the network device, or a transmission delay compensated in the transmission delay compensation, so as to achieve clock synchronization between the terminal device and the network device,
wherein the first delay reference information comprises a time difference between the receiving time of the downlink reference signal and the transmission time of the uplink reference signal, an index of the downlink reference signal.

10. The terminal device of claim 9, wherein the uplink reference signal comprises at least one of the following: a sounding reference signal (SRS), a preamble, or a demodulation reference signal (DMRS).

11. The terminal device of claim 9, wherein the downlink reference signal comprises at least one of the following: a positioning reference signal (PRS), a channel state information reference signal (CSI-RS), a synchronization signal block (SSB), a cell reference signal (CRS), a DMRS, or a tracking reference signal (TRS).

12. The terminal device of claim 9, wherein the signal configuration information further comprises a binding relationship between the uplink reference signal and the downlink reference signal,
wherein the binding relationship is explicitly indicated by a bitmap of the reference signal, or a mapping index of an uplink reference signal and a downlink reference signal at a specific position.

13. The terminal device of claim 9, wherein the first delay reference information further comprises at least one of the following: a receiving time of the downlink reference signal, a transmission time of the uplink reference signal, an index of the downlink reference signal, an index of the uplink reference signal, or a mapping index between the downlink reference signal and the uplink reference signal.

14. The terminal device of claim 9, wherein the processor is configured to:
perform the transmission delay compensation according to compensation subject information.

15. The terminal device of claim 14, wherein the compensation subject information comprises at least one of the following: subject indication information from the network device, subject configuration information from the network device, or compensation subject information predefined by a communication protocol.

16. The terminal device of claim 15, wherein the compensation subject information implicitly indicates a compensation subject, and in a case where the compensation subject information includes that the terminal device performs the transmission delay compensation, the terminal device acts as the compensation subject and receives the second delay reference delay reference information from the network device.

17. The terminal device of claim 9, wherein the signal configuration information further comprises a binding relationship between the uplink reference signal and the downlink reference signal,
wherein the binding relationship is explicitly indicated by a bitmap of the reference signal, or a mapping index of an uplink reference signal and a downlink reference signal at a specific position.

18. A network device, comprising: a processor and a transceiver, wherein the transceiver is configured to:
transmit signal configuration information to the terminal device, the signal configuration information being used to configure a reference signal for transmission delay compensation between the terminal device and the network device,
wherein the reference signal comprises at least one of an uplink reference signal or a downlink reference signal,
wherein the transceiver is further configured to:
receiving first delay reference information to the network device, the first delay reference information being used to determine a signal transmission delay between the terminal device and the network device, or a transmission delay compensated in the transmission delay compensation, so as to implement synchronization between the terminal device and the network device,
wherein the first delay reference information comprises a time difference between the receiving time of the downlink reference signal and the transmission time of the uplink reference signal, an index of the downlink reference signal.

19. The network device of claim 18, wherein the uplink reference signal comprises at least one of the following: a sounding reference signal (SRS), a preamble, or a demodulation reference signal (DMRS).

20. The network device of claim 19, wherein the downlink reference signal comprises at least one of the following: a positioning reference signal (PRS), a channel state information reference signal (CSI-RS), a synchronization signal block (SSB), a cell reference signal (CRS), a DMRS, or a tracking reference signal (TRS).

* * * * *